(12) United States Patent
Morini et al.

(10) Patent No.: US 10,730,974 B2
(45) Date of Patent: Aug. 4, 2020

(54) GAS-PHASE PROCESS FOR THE POLYMERIZATION OF PROPYLENE

(71) Applicant: BASELL POLIOLEFINE ITALIA S.R.L., Milan (IT)

(72) Inventors: Giampiero Morini, Ferrara (IT); Massimo Covezzi, Ferrara (IT); Tiziano Dall'occo, Ferrara (IT); Dario Liguori, Ferrara (IT); Fabrizio Piemontesi, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 38 days.

(21) Appl. No.: 15/750,469

(22) PCT Filed: Aug. 3, 2016

(86) PCT No.: PCT/EP2016/068555
§ 371 (c)(1),
(2) Date: Feb. 5, 2018

(87) PCT Pub. No.: WO2017/021454
PCT Pub. Date: Feb. 9, 2017

(65) Prior Publication Data
US 2018/0215845 A1 Aug. 2, 2018

(30) Foreign Application Priority Data

Aug. 4, 2015 (EP) ..................... 15179708

(51) Int. Cl.
| | | |
|---|---|---|
| *C08F 110/06* | (2006.01) | |
| *C08F 4/654* | (2006.01) | |
| *C08F 4/655* | (2006.01) | |
| *C08F 4/656* | (2006.01) | |
| *C08F 4/651* | (2006.01) | |
| *C08F 10/06* | (2006.01) | |
| *C08F 110/02* | (2006.01) | |
| *C08F 2/34* | (2006.01) | |
| *C08F 4/649* | (2006.01) | |

(52) U.S. Cl.
CPC .......... *C08F 110/06* (2013.01); *C08F 10/06* (2013.01); *C08F 110/02* (2013.01); *C08F 2/34* (2013.01); *C08F 4/6492* (2013.01); *C08F 4/651* (2013.01); *C08F 2500/12* (2013.01); *C08F 2500/15* (2013.01); *C08F 2500/18* (2013.01)

(58) Field of Classification Search
CPC .... C08F 110/06; C08F 4/6546; C08F 4/6576; C08F 4/6578
See application file for complete search history.

(56) References Cited

U.S. PATENT DOCUMENTS

| | | | |
|---|---|---|---|
| 4,857,613 A | 8/1989 | Zolk et al. | |
| 6,468,938 B1 | 10/2002 | Govoni et al. | |
| 9,068,028 B2 | 6/2015 | Collina et al. | |
| 2010/0216955 A1 | 8/2010 | Lee et al. | |
| 2010/0292419 A1* | 11/2010 | Collina | C08F 110/06 526/123.1 |
| 2012/0083576 A1 | 4/2012 | Collina et al. | |
| 2014/0121339 A1 | 5/2014 | Wang et al. | |
| 2014/0316069 A1 | 10/2014 | Galvan et al. | |
| 2016/0032032 A1* | 2/2016 | Galvan | C08F 210/06 526/124.9 |
| 2018/0230253 A1* | 8/2018 | Algozzini | C08F 110/06 |

FOREIGN PATENT DOCUMENTS

| | | |
|---|---|---|
| CN | 101809043 A | 8/2010 |
| EP | 2607386 A1 | 6/2013 |
| JP | 2011508037 A | 3/2011 |
| RU | 2536682 C2 | 12/2014 |
| WO | 0104165 A1 | 1/2001 |
| WO | 2005039745 A1 | 5/2005 |
| WO | 2015062787 A1 | 5/2015 |

OTHER PUBLICATIONS

International Search Report and Written Opinion dated Nov. 7, 2016 (Nov. 7, 2016) for Corresponding PCT/EP2016/068555.

* cited by examiner

*Primary Examiner* — Caixia Lu

(57) ABSTRACT

A gas-phase process for the homopolymerization or copolymerization of propylene with other olefins, including carrying out the polymerization in the presence of a catalyst system made from or containing: (a) a solid catalyst component made from or containing Mg, Ti, halogen, an electron donor selected from 1.3-diethers and an olefin polymer in a specific amount; (b) an aluminum alkyl compound and (c) an external electron donor (ED) compound, wherein components (b) and (c) being employed in amounts such that the Al/(ED) molar ratio ranges from about 2 to about 200.

15 Claims, No Drawings

GAS-PHASE PROCESS FOR THE POLYMERIZATION OF PROPYLENE

This application is the U.S. National Phase of PCT International Application PCT/EP2016/068555, filed Aug. 3, 2016, claiming benefit of priority to European Patent Application No. 15179708.1, filed Aug. 4, 2015, the contents of which are incorporated herein by reference in its entirety.

FIELD OF THE INVENTION

In general, the present disclosure relates to the field of chemistry. More specifically, the present disclosure relates to a gas-phase polymerization process for the polymerization of propylene optionally in mixture with other olefins. In particular, the present disclosure relates to a gas-phase process for the polymerization of propylene carried out in the presence of a specific catalyst system. In addition, the present disclosure relates to the use of a specific catalyst system for generating a self-extinguishing propylene gas-phase polymerization process.

BACKGROUND OF THE INVENTION

Some processes for the polymerization of propylene are carried out in the gas phase in fluidized or mechanically stirred bed reactors, in the presence of catalysts obtained from compounds of transition metals belonging to groups IV, V or VI of the Periodic Table of the Elements and aluminum alkyl compounds generating, in high yields, isotactic polypropylene being more than 95% wt insoluble in xylene at 25° C.

The polymer is obtained in the form of granules having a morphology depending on the morphology of the catalyst; the dimension of the granules, which depends on the original dimension of the catalyst particles and on reaction conditions, is distributed around an average value.

In these types of processes the heat of reaction is removed by a heat exchanger placed inside the reactor or in the recycle line of the reaction gas.

In some processes, a problem in polymerization processes of this type results from the presence of very fine polymer particles which are produced from pre-existing fine catalyst particles or breakage of the catalyst.

These fine particles tend to deposit onto, and electrostatically adhere to, the inner walls of the reactor and of the heat exchanger and then grow in size by polymerization causing an insulating effect and a lower heat transfer resulting in the formation of hot spots in the reactor.

These effects are enhanced when the gas-phase alpha-olefin polymerization process is carried out in the presence of highly active catalysts such as catalysts made from or containing the reaction product of an aluminum alkyl with a titanium compound supported on a magnesium halide in active form.

As a consequence, a loss in fluidization efficiency and homogeneity can occur. In some instances, catalyst feeding interruption may occur as well as clogging of the polymer discharge system. Furthermore, excessive temperature can result in particles melting with the formation of layers of thin agglomerates which adhere to the reactor walls and in the formation of agglomerates which may clog the gas distribution plate.

These drawbacks can lead to poor process reproducibility and a forced interruption to remove deposits which have formed inside the reactor even after relatively short times.

To reduce the extent of catalyst fragmentation, the catalyst can be subject to a pre-polymerization step carried out under mild conditions. In some instances, the pre-polymerization step is performed in a section of the plant immediately connected to the main polymerization section so that the prepolymer produced is directly fed to the main polymerization reactor (also called prepoly in-line) and is characterized by relatively high values of monomer conversion (50-2000 gpolymer/gcat). Alternatively, the pre-polymerization step is carried out in a dedicated section and the prepolymer produced is stored for future use. In this latter case, lower values of monomer conversion rates (0.1-50 g Polymer/gcat) are possible. In both cases and while the pre-polymerization may reduce the extent of improper catalyst fragmentation, the pre-polymerization does not reduce the negative effects of the polymerization activity derived from fine catalyst particles.

SUMMARY OF THE INVENTION

In a general embodiment, the present disclosure provides a gas-phase process for the homopolymerization of propylene or copolymerization of propylene with other olefins including
(i) carrying out the polymerization in the presence of a catalyst system made from or containing:
  (a) a solid catalyst component made from or containing
    (A) Mg,
    (B) Ti,
    (C) halogen,
    (D) an electron donor selected from 1.3-diethers and
    (E) an olefin polymer in an amount ranging from about 10 to about 85 weight % of the total weight of the solid catalyst component;
  (b) an aluminum alkyl compound and
  (c) an external electron donor compound (ED) selected from silicon compounds, ethers, esters, amines, heterocyclic compounds, ketones and any mixture thereof;
wherein components (b) and (c) being employed in amounts such that the Al/(ED) molar ratio ranges from about 2 to about 200. The present disclosure provides a gas-phase polymerization process carried out with a catalyst and/or conditions to produce a polypropylene product having good morphological properties and high stereoregularity as well as self-extinguishing properties.

DETAILED DESCRIPTION OF THE INVENTION

In some embodiments, the solid catalyst component has an average particle size ranging from about 10 to about 100 μm, alternatively from about 20 to about 80 μm.

In some embodiments, the 1,3-diethers are compounds of formula (I)

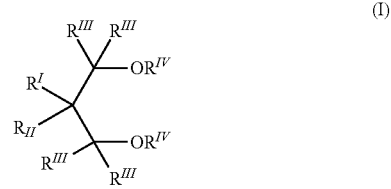

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{II}$ providing that $R^{IV}$ groups are not hydrogen; each of $R^{I}$ to $R^{IV}$ groups can contain heteroatoms selected from halogens, N, O, S and Si.

In some embodiments, $R^{IV}$ is a 1-6 carbon atom alkyl radical and alternatively a methyl while the $R^{II}$ radicals are, in some embodiments, hydrogen. Moreover, when $R^{I}$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^{I}$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^{I}$ and $R^{II}$ can also be the same and can be ethyl, propyl, isopropyl, butyl, isobutyl, tert-butyl, neopentyl, phenyl, benzyl, cyclohexyl, cyclopentyl.

In some embodiments, ethers include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphthyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimetoxypropane, 2,2-di-sec-butyl-1,3-dimetoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimetoxypropane, 2-cyclohexyl-2-cyclohexylmethyl-1,3-dimethoxypropane. Furthermore, in some embodiments, the 1,3-diethers are compounds of formula (II)

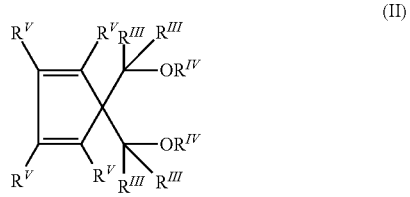

(II)

where the radicals $R^{IV}$ have the same meaning defined in formula (I) and the radicals $R^{III}$ and $R^{V}$, equal or different to each other, are selected from the group consisting of hydrogen; halogens, alternatively Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ arylalkyl radicals and two or more of the $R^{V}$ radicals can be bonded to each other to form condensed cyclic structures, saturated or unsaturated, optionally substituted with $R^{VI}$ radicals selected from the group consisting of halogens, alternatively Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; the radicals $R^{V}$ and $R^{VI}$ optionally containing one or more heteroatoms as substitutes for carbon or hydrogen atoms, or both.

In some embodiments, in the 1,3-diethers of formulae (I) and (II) all the $R^{III}$ radicals are hydrogen, and all the $R^{IV}$ radicals are methyl. Moreover, in some embodiments the 1,3-diethers of formula (II) have two or more of the $R^{V}$ radicals bonded to each other to form one or more condensed cyclic structures optionally substituted by $R^{VI}$ radicals. In some embodiments, the cyclic structures are benzene. In some embodiments, the compounds have formula (III):

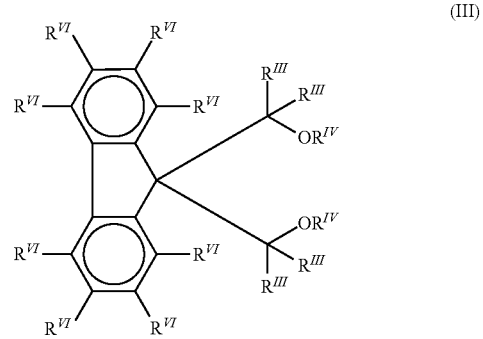

(III)

where the $R^{II}$ and $R^{IV}$ radicals have the same meaning defined in formula (I), $R^{VI}$ radicals equal or different are hydrogen; halogens, alternatively Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, alternatively Cl and F, as substitutes for carbon or hydrogen atoms, or both.

In some embodiments, compounds of formulae (II) and (III) are:
1,1-bis(methoxymethyl)-cyclopentadiene;
1,1-bis(methoxymethyl)-2,3,4,5-tetramethylcyclopentadiene;
1,1-bis(methoxymethyl)-2,3,4,5-tetraphenylcyclopentadiene;
1,1-bis(methoxymethyl)-2,3,4,5-tetrafluorocyclopentadiene;
1,1-bis(methoxymethyl)-3,4-dicyclopentylcyclopentadiene;
1,1-bis(methoxymethyl)indene; 1,1-bis(methoxymethyl)-2,3-dimethylindene;
1,1-bis(methoxymethyl)-4,5,6,7-tetrahydroindene;
1,1-bis(methoxymethyl)-2,3,6,7-tetrafluoroindene;
1,1-bis(methoxymethyl)-4,7-dimethylindene;
1,1-bis(methoxymethyl)-3,6-dimethylindene;
1,1-bis(methoxymethyl)-4-phenylindene;
1,1-bis(methoxymethyl)-4-phenyl-2-methylindene;
1,1-bis(methoxymethyl)-4-cyclohexylindene;
1,1-bis(methoxymethyl)-7-(3,3,3-trifluoropropyl)indene;

1,1-bis(methoxymethyl)-7-trimethyisilylindene;
1,1-bis(methoxymethyl)-7-trifluoromethylindene;
1,1-bis(methoxymethyl)-4,7-dimethyl-4,5,6,7-tetrahydroindene;
1,1-bis(methoxymethyl)-7-methylindene;
1,1-bis(methoxymethyl)-7-cyclopenthylindene;
1,1-bis(methoxymethyl)-7-isopropylindene;
1,1-bis(methoxymethyl)-7-cyclohexylindene;
1,1-bis(methoxymethyl)-7-tert-butylindene;
1,1-bis(methoxymethyl)-7-tert-butyl-2-methylindene;
1,1-bis(methoxymethyl)-7-phenylindene;
1,1-bis(methoxymethyl)-2-phenylindene;
1,1-bis(methoxymethyl)-1H-benz[e]indene;
1,1-bis(methoxymethyl)-1H-2-methylbenz[e]indene;
9,9-bis(methoxymethyl)fluorene;
9,9-bis(methoxymethyl)-2,3,6,7-tetramethylfluorene;
9,9-bis(methoxymethyl)-2,3,4,5,6,7-hexafluorofluorene;
9,9-bis(methoxymethyl)-2,3-benzofluorene;
9,9-bis(methoxymethyl)-2,3,6,7-dibenzofluorene;
9,9-bis(methoxymethyl)-2,7-diisopropylfluorene;
9,9-bis(methoxymethyl)-1,8-dichlorofluorene;
9,9-bis(methoxymethyl)-2,7-dicyclopentylfluorene;
9,9-bis(methoxymethyl)-1,8-difluorofluorene;
9,9-bis(methoxymethyl)-1,2,3,4-tetrahydrofluorene;
9,9-bis(methoxymethyl)-1,2,3,4,5,6,7,8-octahydrofluorene;
9,9-bis(methoxymethyl)-4-tert-butylfluorene.

In some embodiments, the 1.3-diether/Mg molar ratio ranges from about 0.030 to about 0.150, alternatively from about 0.035 to about 0.010. In some embodiments, the Mg/Ti molar ratio ranges from about 4 to about 10, alternatively from about 5 to about 8.

In some embodiments, the olefin polymer part of the solid catalyst component (a) is selected from homopolymers and copolymers of olefins of formula $CH_2=CHR$, in which R is hydrogen or a hydrocarbyl radical with 1-12 carbon atoms. In some embodiments, the olefins are selected from ethylene, propylene or mixtures thereof. In some embodiments, ethylene or propylene is used alone.

In some embodiments, the amount of olefin polymer in the solid catalyst component (a) ranges from about 15 to about 75% wt based on the total weight of solid catalyst component (a).

In some embodiments, the solid catalyst component (a) is a pre-polymerized solid catalyst component. In some embodiments, the solid catalyst component (a) is obtained by subjecting an original solid catalyst component containing Mg, Ti, halogen and an electron donor selected from 1.3-diethers to pre-polymerization conditions in the presence of the olefin monomer and an Al-alkyl compound.

The pre-polymerized solid catalyst component is made from or contains the original solid catalyst component containing Mg, Ti, halogen and an electron donor selected from 1.3-diethers and an amount of polyolefin deriving from the polymerization of the original solid catalyst component with an olefin monomer, of equal to or lower than, about 5 times the amount of the original solid catalyst component.

In the present description, the term "pre-polymerization conditions" as used herein refers to the complex of conditions in terms of temperature, monomer concentration, temperature and amount of reagents to prepare the pre-polymerized catalyst component.

In some embodiments, the amount of alkyl-Al compounds is such as to have an Al/catalyst weight ratio from ranging from about 0.001 to about 10, alternatively from about 0.005 to about 5 and alternatively from about 0.01 to about 2.5. In some embodiments, an external donor selected from silicon compounds, ethers, esters, amines, heterocyclic compounds, ketones and 1,3-diethers of the general formula (I) is employed.

In some embodiments, the pre-polymerization is carried out in liquid phase, (slurry or bulk) or in gas-phase at temperatures ranging from about −20 to about 80° C., alternatively from about 0° C. to about 75° C. In some embodiments, the pre-polymerization is carried out in a liquid diluent. In some embodiments, the liquid diluent is light hydrocarbons. In some embodiments, the hydrocarbons are selected from the group consisting of pentane, hexane and heptane. In an alternative embodiment the pre-polymerization can be carried out in a more viscous medium. In some embodiments, the viscous medium has a kinematic viscosity ranging from about 5 to about 100 cSt at 40° C. In some embodiments, the medium is a pure substance or a homogeneous mixture of substances having different kinematic viscosity. In some embodiments, the medium is a hydrocarbon medium. In some embodiments, the medium has a kinematic viscosity ranging from about 10 to about 90 cSt at 40° C.

In some embodiments, the original catalyst component concentration in the liquid diluent ranges from about 10 to about 300 g/l, alternatively from about 40 to about 200 g/l.

In some embodiments, the pre-polymerization time ranges from about 0.25 to about 30 hours, alternatively from about 0.5 to about 20 hours and alternatively from about 1 to about 15 hours. In some embodiments, the olefin monomer to be pre-polymerized is fed in a predetermined amount and in one step in the reactor before the prepolymerization. In an alternative embodiment, the olefin monomer is continuously supplied to the reactor during polymerization at the desired rate.

In some embodiments, the original solid catalyst component, free of an olefin polymer, is characterized by a porosity, measured by the mercury method, due to pores with radius equal to or lower than about 1 μm, ranging from about 0.15 cm$^3$/g to about 1.5 cm$^3$/g, alternatively from about 0.3 cm$^3$/g to about 0.9 cm$^3$/g and alternatively from about 0.4 to about 0.9 cm$^3$/g.

The original solid catalyst component and the solid catalyst component (a) as well, is made from or contains, in addition to electron donors, a titanium compound having at least a Ti-halogen bond and a Mg halide. In some embodiments, the magnesium halide is MgCl$_2$ in active form.

In some embodiments, the titanium compounds are TiCl$_4$ and TiCl$_3$. In some embodiments, the titanium compounds are Ti-haloalcoholates of formula Ti(OR)$_{n-y}$X$_y$, where n is the valence of titanium, y is a number between 1 and n−1, X is halogen and R is a hydrocarbon radical having from 1 to 10 carbon atoms.

In some embodiments, the original catalyst component (a) has an average particle size ranging from about 10 to about 100 μm.

In some embodiments, the alkyl-Al compound (b) is chosen among the trialkyl aluminum compounds. In some embodiments, the alkyl-Al compound (b) is selected from the group consisting of triethylaluminum, tri-n-hexylaluminum, and tri-n-octylaluminum. In some embodiments, the alkyl-Al compound (b) is a mixture of trialkylaluminums with alkylaluminum halides, alkylaluminum hydrides or alkylaluminum sesquichlorides. In some embodiments, the alkylaluminum sesquichloride is selected from the group consisting of AlEt$_2$C$_1$ and Al$_2$Et$_3$Cl$_3$.

In some embodiments, the aluminum alkyl compound (b) is used in the gas-phase process in amount such that the Al/Ti molar ratio ranges from about 10 to about 400, alternatively from about 30 to about 250 and alternatively from about 40 to about 100.

In some embodiments, the external electron-donors are 1,3 diethers. In some embodiments, internal donors in the solid catalyst component (a) are 1,3 diethers. In some embodiments, the external electron-donors are esters of aliphatic saturated mono or dicarboxylic acids such as malonates, succinates and glutarates. In some embodiments, the external electron-donor is 2,2,6,6-tetramethyl piperidine. In some embodiments, the external electron-donors are silicon compounds having at least a Si—O—C bond. In some embodiments, the external electron-donors are silicon compounds of formula $R_a{}^5R_b{}^6Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms selected from N, O, halogen and P. In some embodiments, the external electron-donors are selected from the group consisting of methylcyclohexyldimethoxysilane, diphenyldimethoxysilane, methyl-t-butyldimethoxysilane, dicyclopentyldimethoxysilane, 2-ethylpiperidinyl-2-t-butyldimethoxysilane and 1,1,1,trifluoropropyl-2-ethylpiperidinyl-dimethoxysilane and 1,1,1,trifluoropropyl-metil-dimethoxysilane. The external electron donor compound used in the main polymerization process is employed used in such an amount to give a molar ratio between the organo-aluminum compound (b) used in the main polymerization process and the electron donor compound of from about 2 to about 200, alternatively from about 5 to about 150, alternatively from about 7 to about 100 and alternatively from about 7 to about 70.

The gas-phase process can be carried out with any gas-phase reactor or technology. In some embodiments, the gas-phase process is carried out operating in one or more fluidized or mechanically agitated bed reactors. In some instances, in the fluidized bed reactors the fluidization is obtained by a stream of inert fluidization gas the velocity of which is not higher than transport velocity, thereby confining the bed of fluidized particles to a zone of the reactor. In some instances, in the mechanically agitated bed reactor the polymer bed is kept in place by the gas flow generated by the continuous blade movement the regulation of which also determine the height of the bed. In some embodiments, the operating temperature is between about 50 and about 85° C., alternatively between about 60 and about 85° C., while the operating pressure is set from between about 0.5 and about 8 MPa, alternatively between about 1 and about 5 MPa alternatively between about 1.0 and about 3.0 MPa. In some embodiments, inert fluidization gases are selected from nitrogen or saturated light hydrocarbons. In some embodiments, the saturated light hydrocarbons are selected from the group consisting of propane, pentane, hexane or mixture thereof.

In some embodiments, the polymer molecular weight is controlled by the amount of hydrogen or another molecular weight regulator such as $ZnEt_2$. In some embodiments, if hydrogen is used, the hydrogen/propylene molar ratio is between about 0.0002 and about 0.5, the propylene monomer is from about 20% to about 100% by volume, alternatively from about 30 to about 70% by volume, based on the total volume of the gases present in the reactor. The remaining portion of the feeding mixture is inert gases and one or more α-olefin comonomers, if any.

In some embodiments, the gas-phase technology includes the use of gas-phase polymerization devices including at least two interconnected polymerization zones. The process is carried out in a first and in a second interconnected polymerization zone to which propylene and ethylene or propylene and alpha-olefins are fed in the presence of a catalyst system and from which the polymer produced is discharged. The growing polymer particles flow through the first of the polymerization zones (riser) under fast fluidization conditions, leave the first polymerization zone and enter the second of the polymerization zones (downcomer) through which the polymer particles flow in a densified form under the action of gravity, leave the second polymerization zone and are reintroduced into the first polymerization zone, thereby establishing a circulation of polymer between the two polymerization zones. In some embodiments, the conditions of fast fluidization in the first polymerization zone is established by feeding the monomers gas mixture below the point of reintroduction of the growing polymer into the first polymerization zone. In some embodiments, the velocity of the transport gas into the first polymerization zone is higher than the transport velocity under the operating conditions and between about 2 and about 15 m/s. In the second polymerization zone, where the polymer flows in densified form under the action of gravity, high values of density of the solid are reached which approach the bulk density of the polymer; a positive gain in pressure can be obtained along the direction of flow, permitting reintroduction of the polymer into the first reaction zone without the help of mechanical means. In this way, a "loop" circulation is set up, which is defined by the balance of pressures between the two polymerization zones and by the head loss introduced into the system. In some embodiments, one or more inert gases, such as nitrogen or an aliphatic hydrocarbon, are maintained in the polymerization zones, in such quantities that the sum of the partial pressures of the inert gases is between about 5 and about 80% of the total pressure of the gases. The operating temperature ranges from about 50 and about 85° C., alternatively between about 60 and about 85° C., while the operating pressure ranges from about 0.5 to about 10 MPa, alternatively between about 1.5 and about 6 MPa. In some embodiments, the catalyst components are fed to the first polymerization zone, at any point of the first polymerization zone. In some embodiments, the catalyst components are fed at any point of the second polymerization zone. In some embodiments, a molecular weight regulator is used. As described in Patent Cooperation Treaty Publication No. WO00/02929 (incorporated herein by reference), the gas mixture in the riser is totally or partially prevented from entering the downcomer. In some embodiments, the gas mixture is prevented from entering the downcomer by introducing in the downcomer a gas and/or liquid mixture having a composition different from the gas mixture present in the riser. In some embodiments, there are two interconnected polymerization zones having different monomer compositions, thereby producing polymers with different properties.

In some embodiments, the pre-polymerization process for the preparation of the solid catalyst component (a) is carried out in a pre-polymerization section immediately upstream the gas-phase reactor. In some embodiments, the pre-polymerization process is carried out in a batch dedicated plant. In some embodiments, the obtained catalyst component (a) is stored and fed to the polymerization plant when needed.

In some embodiments, a satisfying level of self-extinguishing properties is present if the polymerization activity at temperature higher than about 85° C. is about 70% or less, alternatively about 65% or less, alternatively about 60% or less, the value of the polymerization activity at about 70° C. In some embodiments, the present disclosure provides a method for carrying out a self-extinguishing gas-phase polymerization process for the polymerization of propylene including feeding into a gas-phase polymerization reactor propylene optionally in mixture with minor amounts of other olefins, and a catalyst system made from or containing:

(a) a solid catalyst component made from or containing Mg, Ti, halogen, an electron donor selected from 1.3-diethers and an olefin polymer in an amount ranging from about 10 to about 85 weight % of the total weight of the solid catalyst component;

(b) an aluminum alkyl compound and (c) an external electron donor compound (ED) selected from silicon compounds, ethers, esters, amines, heterocyclic compounds, ketones and any mixture thereof, wherein the components (b) and (c) are employed in amounts such that the Al/(ED) molar ratio ranges from about 2 to about 200.

In some embodiments, the products have bulk density values over about 0.42 cm³/g.

EXAMPLES

The following examples are illustrative and not intended to limit the scope of this disclosure in any manner.

Characterization

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference, the X.I. %.

Average Particle Size of the Adduct, Catalysts and Pre-Polymers

Determined by a method based on the optical diffraction of monochromatic laser light, with the "Malvern Instr. 2600" apparatus. The average size is given as P50.

Melt Flow Rate (MFR)

Determined according to ISO 1133 (230° C., 2.16 Kg)

Porosity and Surface Area with Mercury:

The measure was carried out using a "Porosimeter 2000 series".

The porosity was determined by absorption of mercury under pressure. For this determination use was made of a calibrated dilatometer (diameter 3 mm) CD3 connected to a reservoir of mercury and to a high-vacuum pump (1·10-2 mbar). A weighed amount of sample was placed in the dilatometer. The apparatus was then placed under high vacuum (<0.1 mm Hg) and maintained in these conditions for 20 minutes. The dilatometer was then connected to the mercury reservoir and the mercury was allowed to flow slowly into dilatometer until the mercury reaches the level marked on the dilatometer at a height of 10 cm. The valve that connects the dilatometer to the vacuum pump was closed and then the mercury pressure was gradually increased with nitrogen up to 140 kg/cm². Under the effect of the pressure, the mercury entered the pores and the level went down according to the porosity of the material.

The porosity (cm3/g), due to pores up to 1 μm for catalysts (10 μm for polymers), the pore distribution curve, and the average pore size were directly calculated from the integral pore distribution curve which is function of the volume reduction of the mercury and applied pressure values (all these data are provided and elaborated by the porosimeter associated computer which is equipped with a "MILESTONE 200/2.04" program.

Poured Bulk Density [g/cm³]:

measured according to DIN-53194

General Procedure for the Preparation of MgCl$_2$.(EtOH)$_m$ Adducts.

An initial amount of microspheroidal MgCl$_2$.2.8C$_2$H$_5$OH was prepared according to the method described in Example 2 of U.S. Pat. No. 4,399,054 (incorporated herein by reference) but operating at 3,000 rpm instead of 10,000. The adduct having an average particle size of 35 μm was then subjected to thermal dealcoholation at increasing temperatures from 30 to 130° C. operating in nitrogen current until the molar alcohol content per mol of Mg was 1.99. The final particle size was determined to be P50=40 μm.

Preparation of Non-Prepolymerized Solid Catalyst Component—General Procedure.

Into a 3.0-liter round bottom flask, equipped with mechanical stirrer, cooler and thermometer 2.0 l of TiCl$_4$ were introduced at room temperature under nitrogen atmosphere. After cooling at −5° C., while stirring, 100 g of microspheroidal MgCl$_2$.2.0C$_2$H$_5$OH were introduced. The temperature was then raised from −5° C. up to 40° C. at a speed of 0.4° C./min. When the temperature of 40° C. was reached, 26.7 g of 9,9-bis(methoxymethyl)fluorene, as internal donor, was introduced. At the end of the addition, the temperature was increased up to 100° C. at a speed of 0.8° C./min and maintained fixed at this value for 60 minutes. Thereafter, stirring was stopped, the solid product was allowed to settle and the supernatant liquid was siphoned off maintaining the temperature at 100° C. After the supernatant was removed, additional 1.9 l of fresh TiCl$_4$ were added and the mixture was then heated at 110° C. and kept at this temperature for 30 minutes. Again the stirring was interrupted; the solid product was allowed to settle and the supernatant liquid was siphoned off maintaining the temperature at 110° C. A third aliquot of fresh TiCl$_4$ (1.9 l) was added, the mixture was maintained under agitation at 110° C. for 30 minutes and then the supernatant liquid was siphoned off. The solid was washed with anhydrous i-hexane five times (5×1.0 l) in temperature gradient up to 60° C. and one time (1.0 l) at room temperature. The solid was finally dried under vacuum and analyzed. Catalyst composition: Mg=15.1 wt %; Ti=4.4 wt %; I.D.=14.5 wt %; P50=41.2 μm.

General Procedure for Gas Phase Propylene Polymerization

A lab-scale fluidized bed reactor, equipped with recirculation gas compressor, heat exchanger, and automated temperature controller was used to polymerize propylene in gas phase. The fluidized bed reactor was set at temperature, pressure and composition, to reach the targets values after feeding the pre-polymerized catalyst. Target values for the polymerization were: total pressure 20 barg, composed of 93.8% mol of propylene, 5% mol of propane, and 1.2% mol of hydrogen. In a glass flask, 0.35 g of triethyl aluminum, methyl-cyclohexyl dimethoxy silane (ED) when used, and about 40-100 mg of solid catalyst component (or prepolymerized catalyst) were charged in 100 mL of i-hexane. The catalyst was pre-contacted at room temperature for 10 minutes. Then, the content of the flask was fed into a 0.8 L autoclave. The autoclave was closed, 100 grams of liquid propane (and from 6 to 40 grams of propylene in comparative examples 2-4 where the in-line prepolymerization was performed) were added. The catalyst mixture was stirred at 30° C. for 15 min (unless otherwise specified). Subsequently, the content of the autoclave was fed to the fluidized bed reactor. The polymerization was carried out for 2 hours, while the pressure of the reactor was kept constant by feeding continuously gaseous propylene, enough to make up for the reacted monomer. After 2 hours, the formed polymer bed was discharged, degassed and characterized.

Example 1

Preparation of the Pre-Polymerized Catalyst

Into a 250 cm$^3$ glass-vessel/stainless steel autoclave with a mechanical anchor stirrer, at room temperature and under a nitrogen atmosphere, 100 cm$^3$ of i-hexane containing 0.28 g of tri-n-octyl aluminum (TNOA) and 9.2 g of the spherical catalyst were introduced. The stirring was set at about 300 rpm, and the internal temperature was increased to 50° C. during a time of 30 minutes. Maintaining constant the temperature of the reactor, ethylene was carefully introduced with a constant flow for 4 h. The polymerization was discontinued when a theoretical conversion of 3 g of polymer per g of catalyst was deemed to be reached. The resulting pre-polymerized catalyst was dried under vacuum at room temperature and analyzed. It contained 2.97 g of polyethylene per g of solid catalyst (74% polymer). Pre-polymer composition: Mg=3.8 wt %; Ti=1.1 wt %; I.D.=3.5 wt %; P50=73.4 µm. The catalyst component was then used in a double run gas phase polymerization of propylene at 700 and 90° C. respectively.

Example 2

Preparation of the Pre-Polymerized Catalyst

Into a 250 cm$^3$ glass-vessel/stainless steel autoclave with a mechanical anchor stirrer, at room temperature and under a nitrogen atmosphere, 100 cm$^3$ of i-hexane containing 0.63 g of tri-n-octyl aluminum (TNOA) and 20.2 g of the spherical catalyst were introduced. The stirring was set at about 300 rpm, and the internal temperature was increased to 50° C. during a time of 30 minutes. Maintaining constant the temperature of the reactor, ethylene was carefully introduced with a constant flow for 4 h. The polymerization was discontinued when a theoretical conversion of 0.8 g of polymer per g of catalyst was deemed to be reached. The resulting pre-polymerized catalyst was dried under vacuum at room temperature and analyzed. It contained 0.84 g of polyethylene per g of solid catalyst (45.6% of polymer). Pre-polymer composition: Mg=8.2 wt %; Ti=2.5 wt %; I.D.=6.6 wt %; P50=52.1 µm. The catalyst component was then used in a double run gas phase polymerization of propylene at 700 and 90° C. respectively.

Example 3

Preparation of the Pre-Polymerized Catalyst)

Into a 250 cm$^3$ glass-vessel/stainless steel autoclave with a mechanical anchor stirrer, at room temperature and under a nitrogen atmosphere, 100 cm$^3$ of i-hexane containing 0.60 g of tri-n-octyl aluminum (TNOA) and 19.8 g of the spherical catalyst were introduced. The stirring was set at about 300 rpm, and the internal temperature was increased to 50° C. during a time of 30 minutes. Maintaining constant the temperature of the reactor, ethylene was carefully introduced with a constant flow for 3 h. The polymerization was discontinued when a theoretical conversion of 0.5 g of polymer per g of catalyst was deemed to be reached. The resulting pre-polymerized catalyst was dried under vacuum at room temperature and analyzed. It contained 0.55 g of polyethylene per g of solid catalyst (35.4% polymer). Pre-polymer composition: Mg=9.8 wt %; Ti=2.9 wt %; I.D.=8.7 wt %; P50=47.7 µm. The catalyst component was then used in a double run gas phase polymerization of propylene at 700 and 90° C. respectively.

Example 4

Preparation of the Pre-Polymerized Catalyst

Into a 250 cm$^3$ glass-vessel/stainless steel autoclave with a mechanical anchor stirrer, at room temperature and under a nitrogen atmosphere, 100 cm$^3$ of i-hexane containing 0.63 g of tri-n-octyl aluminum (TNOA) and 20.5 g of the spherical catalyst were introduced. The stirring was set at about 300 rpm, and the internal temperature was increased to 50° C. during a time of 30 minutes. Maintaining constant the temperature of the reactor, ethylene was carefully introduced with a constant flow for 2 h. The polymerization was discontinued when a theoretical conversion of 0.25 g of polymer per g of catalyst was deemed to be reached. The resulting pre-polymerized catalyst was dried under vacuum at room temperature and analyzed. It contained 0.28 g of polyethylene per g of solid catalyst (21.8% polymer). Pre-polymer composition: Mg=11.8 wt %; Ti=3.4 wt %; I.D.=9.0 wt %; P50=43.3 µm. The catalyst component was then used in a double run gas phase polymerization of propylene at 700 and 90° C. respectively.

Comparative Example 1

The catalyst component, without being subject to pre-polymerization, was used in a double run gas phase polymerization of propylene at 700 and 90° C. respectively.

Comparative Examples 2-4

The catalyst component was used in the gas phase polymerization of propylene, including an in-line pre-polymerization. In the first series of double run carried out at 700 and 90° C. respectively (Comparative 2) 6 g of propylene were pre-polymerized for 5 minutes. In the second series (Comparative 3) 6 g of propylene were pre-polymerized for 15 minutes, and in the third series (Comparative 4) 40 grams of propylene were pre-polymerized for 15 minutes. The polymer conversion was measured by weighing the pre-polymer produced in a parallel run carried out under identical conditions. Taking into account one gram of catalyst component the conversion in comparative 2 was 10 (90% polymer), in comparative 3 was 24 (96% polymer) and in comparative 4 was 88 (98.8% polymer).

Example 5

Preparation of the Pre-Polymerized Catalyst in Oil-Slurry

Into a 250 cm$^3$ glass-vessel/stainless steel autoclave with a mechanical anchor stirrer, at room temperature and under a nitrogen atmosphere, 80 cm$^3$ of dried oil (Winog-70), 20 cm$^3$ of i-hexane containing 0.62 g of tri-n-octyl aluminum (TNOA) and 19.0 g of the spherical catalyst were introduced. The stirring was set at about 300 rpm, and the internal temperature was increased to 70° C. during a time of 30 minutes. Maintaining constant the temperature of the reactor, 1.0 bar of hydrogen overpressure was introduced while ethylene was carefully fed with a constant flow for 4 h. The polymerization was discontinued when a theoretical conversion of 1 g of polymer per g of catalyst was deemed to be reached. The resulting pre-polymerized catalyst was maintained in oil/i-hexane slurry. 50 cm$^3$ of slurry were diluted with i-hexane under stirring, the solvent siphoned off and the residual solid prepolymer washed 3 times with 50 ml of dried i-hexane, and analyzed. It contained 1.01 g of polyethylene per g of solid catalyst. Prepolymer composition: Mg=7.5 wt %; Ti=2.0 wt %; I.D.=6.3 wt %; P50=57.6 µm. The catalyst component was then used in a double run gas phase polymerization of propylene at 700 and 90° C. respectively.

Example 6

Preparation of the Pre-Polymerized Catalyst in Oil-Slurry

Into a 250 cm$^3$ glass-vessel/stainless steel autoclave with a mechanical anchor stirrer, at room temperature and under a nitrogen atmosphere, 80 cm$^3$ of dried oil (Winog-70), 20 cm$^3$ of i-hexane containing 4.4 g of tri-ethyl aluminum (TEA), 16.95 g of the spherical catalyst and 0.1 g of cyclo-hexyl-methyl dimethoxy silane (ED) were introduced. The stirring was set at about 300 rpm, and maintained, with continuous stirring at room temperature for 30 minutes and then the internal temperature was decreased to 10° C. Maintaining constant the temperature of the reactor, propylene was carefully fed with a constant flow for 4 h. The polymerization was discontinued when a theoretical conversion of 1.4 g of polymer per g of catalyst was deemed to be reached. The resulting pre-polymerized catalyst was maintained in oil/i-hexane slurry. 50 cm$^3$ of slurry was diluted with i-hexane under stirring, the solvent siphoned off and the residual solid prepolymer washed 3 times with 50 ml of dried i-hexane, and analyzed. It contained 1.19 g of polypropylene per g of solid catalyst. Prepolymer composition: Mg=7.1 wt %; Ti=1.9 wt %; I.D.=5.5 wt %; P50=69.9 µm. The catalyst component was then used in a double run gas phase polymerization of propylene at 700 and 90° C. respectively.

Examples 7-9 and Comparative 5

Preparation of the Pre-Polymerized Catalyst

Into a 250 cm$^3$ glass-vessel/stainless steel autoclave with a mechanical anchor stirrer, at room temperature and under a nitrogen atmosphere, 100 cm$^3$ of i-hexane containing 0.60 g of tri-n-octyl aluminum (TNOA) and 19.6 g of the spherical catalyst were introduced. The stirring was set at about 300 rpm, and the internal temperature was increased to 50° C. during a time of 30 minutes. Maintaining constant the temperature of the reactor, ethylene was carefully introduced with a constant flow for 4 h. The polymerization was discontinued when a theoretical conversion of 1 g of polymer per g of catalyst was deemed to be reached. The resulting pre-polymerized catalyst was dried under vacuum at room temperature and analyzed. It contained 1.00 g of polyethylene per g of solid catalyst. Prepolymer composition: Mg=7.6 wt %; Ti=2.1 wt %; I.D.=6.2 wt %; P50=54.2 µm. The catalyst component was then used in a double run gas phase polymerization of propylene at 700 and 90° C. respectively.

Example 10

Preparation of Solid Catalyst Component.

The solid catalyst component was prepared with an internal donor (ID) of 2-i-propyl-2-i-butyl-1,3-dimetoxy propane, instead of 9,9-bis(methoxymethyl)fluorene. The catalyst composition was the following: Mg 18.3 wt %; Ti 3.1 wt %; ID 14.7 wt %; P50 40.4 µm.

Preparation of the Pre-Polymerized Catalyst

Into a 250 cm$^3$ glass-vessel/stainless steel autoclave with a mechanical anchor stirrer, at room temperature and under a nitrogen atmosphere, 150 cm$^3$ of i-hexane containing 0.32 g of tri-n-octyl aluminum (TNOA) and 14.5 g of the catalyst were introduced. The stirring was set at about 300 rpm, and the internal temperature was increased to 50° C. during a time of 30 minutes. Maintaining constant the temperature of the reactor, ethylene was carefully introduced with a constant flow for 2 h. The polymerization was discontinued when a theoretical conversion of 0.25 g of polymer per g of catalyst was deemed to be reached. The resulting pre-polymerized catalyst was dried under vacuum at room temperature and analyzed. It contained 0.28 g of polyethylene per g of solid catalyst (22% polymer). Prepolymer composition: Mg 14.3 wt %; Ti 2.3 wt %; ID 11.7 wt %; at solvent zero; P50 43.0 µm. The catalyst component was then used in a double run gas phase polymerization of propylene at 700 and 90° C. respectively.

Example 11

Preparation of the Pre-Polymerized Catalyst

Into a 250 cm$^3$ glass-vessel/stainless steel autoclave with a mechanical anchor stirrer, at room temperature and under a nitrogen atmosphere, 150 cm$^3$ of i-hexane containing 0.24 g of tri-n-octyl aluminum (TNOA) and 10.46 g of the spherical catalyst prepared as described in Example 10 were introduced. The stirring was set at about 300 rpm, and the internal temperature was increased to 50° C. during a time of 30 minutes. Maintaining constant the temperature of the reactor, ethylene was carefully introduced with a constant flow for 4 h. The polymerization was discontinued when a theoretical conversion of 1.0 g of polymer per g of catalyst was deemed to be reached. The resulting pre-polymerized catalyst was dried under vacuum at room temperature and analyzed. It contained 1.13 g of polyethylene per g of solid catalyst (53% polymer). Prepolymer composition: Mg 8.6 wt %; Ti 1.4 wt %; at solvent zero; P50 63.0 µm. The catalyst component was then used in a double run gas phase polymerization of propylene at 700 and 90° C. respectively.

Example 12

Preparation of the Pre-Polymerized Catalyst

Into a 250 cm$^3$ glass-vessel/stainless steel autoclave with a mechanical anchor stirrer, at room temperature and under a nitrogen atmosphere, 150 cm$^3$ of i-hexane containing 1.35 g of tri-n-octyl aluminum (TNOA) and 12.12 g of the spherical catalyst prepared as described in Example 10 and 0.14 g of cyclo-hexyl-methyl dimethoxy silane (CHMMS) were introduced. The stirring was set at about 300 rpm, and maintained, with continuous stirring at room temperature for 30 minutes and then the internal temperature was decreased to 10° C. Maintaining constant the temperature of the reactor, propylene was carefully fed with a constant flow for 3 h. The polymerization was discontinued when a theoretical conversion of 0.5 g of polymer per g of catalyst was deemed to be reached. The resulting pre-polymerized catalyst was dried under vacuum at room temperature and analyzed. It contained 0.58 g of polypropylene per g of solid catalyst. Prepolymer composition: Mg 11.6 wt %; Ti 1.9 wt %; I.D. 8.6 wt %; P50 59.0 µm. The catalyst component was then used in a double run gas phase polymerization of propylene at 700 and 90° C. respectively.

Comparative Example 6

A catalyst component, without being subject to pre-polymerization and with 1,2-dimethoxypropane (DMP) as ID, was prepared. The catalyst composition was the following: Mg 16.8 wt %; Ti 5.5 wt %; ID 4.7 wt %; It was used in a single run gas phase polymerization of propylene at 70°.

TABLE 1

| Example | Al/Ti mol | Al/ED mol | T °C. | Activity Kg$_{PP}$/g$_{cat}$ | Residual Activity @90° C. % | BD g/cm³ | MI "L" g/10' | X.I. wt. % |
|---|---|---|---|---|---|---|---|---|
| 1 | 131 | 16.5 | 70 | 7.2 | | 0.434 | 10.4 | 98.5 |
|   | 124 | 16.5 | 90 | 3.6 | 50 | | | |
| 2 | 102 | 16.5 | 70 | 14.5 | | 0.432 | 13.0 | 98.2 |
|   | 56 | 16.5 | 90 | 7.9 | 55 | | | |
| 3 | 97 | 16.5 | 70 | 15.4 | | 0.440 | 12.0 | 98.2 |
|   | 49 | 16.5 | 90 | 8.3 | 54 | | | |
| 4 | 84 | 16.5 | 70 | 20.8 | | 0.421 | 9.0 | 98.2 |
|   | 38 | 16.5 | 90 | 10.2 | 49 | | | |
| Comp. 1 | 80 | 16.5 | 70 | 24 | | 0.381 | 7.4 | 98.8 |
|   | 88 | 16.5 | 90 | 15.5 | 65 | | | |
| Comp. 2 | 73 | 16.5 | 70 | 20 | | 0.399 | 10.0 | 98.1 |
|   | 67 | 16.5 | 90 | 13.4 | 67 | | | |
| Comp. 3 | 77 | 16.5 | 70 | 18.6 | | 0.408 | 9.7 | 98.2 |
|   | 78 | 16.5 | 90 | 13.4 | 72 | | | |
| Comp. 4 | 73 | 16.5 | 70 | 20.4 | | 0.392 | 9.4 | 98.1 |
|   | 69 | 16.5 | 90 | 15.1 | 74 | | | |
| 5 | 132 | 16.5 | 70 | 15.7 | | 0.439 | 9.2 | 98.2 |
|   | 92 | 16.5 | 90 | 7.4 | 47 | | | |
| 6 | 142 | 16.5 | 70 | 13.5 | | 0.439 | 10.7 | 97.9 |
|   | 116 | 16.5 | 90 | 6.3 | 46 | | | |
| 7 | 92 | 16.5 | 70 | 11.3 | | 0.427 | 16.4 | 98.0 |
|   | 102 | 16.5 | 90 | 5.6 | 49 | | | |
| 8 | 205 | 50 | 70 | 13.7 | | 0.426 | 14 | 97.5 |
|   | 194 | 50 | 90 | 8.0 | 59 | | | |
| 9 | 116 | 99 | 70 | 16.3 | | 0.434 | 17.2 | 97.1 |
|   | 109 | 99 | 90 | 9.7 | 60 | | | |
| COMP. 5 | 97 | — | 70 | 19.9 | | 0.416 | 23.3 | 96.9 |
|   | 85 | — | 90 | 16.3 | 82 | | | |
| 10 | 118 | 16.5 | 70 | 17.2 | | 0.419 | 13.7 | 98.3 |
|   | 120 | 16.5 | 90 | 7.4 | 43 | | | |
| 11 | 131 | 16.5 | 70 | 8.9 | | 0.409 | 12.3 | 98.5 |
|   | *129* | *16.5* | *90* | *4.1* | *46* | | | |
| 12 | 152 | 16.5 | 70 | 6.6 | | 0.423 | 12.6 | 98.2 |
|   | *130* | *16.5* | *90* | *3.6* | *55* | | | |
| COMP. 6 | 80 | 16.5 | 70 | 11.7 | | 0.301 | 12.4 | 89.9 |

What is claimed is:

1. A gas-phase process for the homopolymerization of propylene or copolymerization of propylene with other olefins comprising:

(i) carrying out the polymerization in the presence of a catalyst system comprising:

(a) a solid catalyst component comprising (A) Mg, (B) Ti, (C) halogen, (D) an electron donor, wherein the electron donor consists of 1,3-diethers and (E) an olefin polymer in an amount ranging from about 10 to about 85 weight % of the total weight of the solid catalyst component, wherein the 1,3-diether/Mg molar ratio ranges from about 0.030 to about 0.150;

(b) an aluminum alkyl compound; and (c) an external electron donor (ED) compound selected from silicon compounds, ethers, esters, amines, heterocyclic compounds, ketones, wherein components (b) and (c) being employed in amounts such that the Al/(ED) molar ratio ranges from about 2 to about 200.

2. The gas phase process according to claim 1, wherein the solid catalyst component has an average particle size ranging from about 10 to about 100 μm.

3. The gas phase process according to claim 1, wherein the 1,3-diethers are compounds of formula (I)

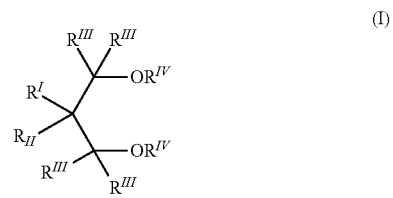

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ providing that $R^{IV}$ groups are not hydrogen; each of $R^I$ to $R^{IV}$ groups can contain heteroatoms selected from halogens, N, O, S and Si.

4. The gas phase process according to claim 3, wherein the 1,3 diethers are compounds of formula (III):

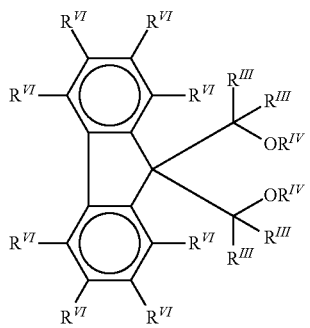

(III)

where the $R^{VI}$ radicals equal or different are hydrogen; halogens; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens as substitutes for carbon or hydrogen atoms, or both.

5. The gas phase process according to claim 1, wherein the 1,3-diether/Mg molar ratio ranges from 0.035 to 0.1.

6. The gas phase process according to claim 1, wherein the Mg/Ti molar ratio ranges from about 4 to about 10.

7. The gas phase process according to claim 1, wherein the olefin polymer is selected from the group consisting of homopolymers and copolymers of olefins of formula $CH_2$=CHR, wherein R is hydrogen or a hydrocarbyl radical with 1-12 carbon atoms.

8. The gas phase process according to claim 7, wherein the olefins are selected from the group consisting of ethylene, propylene or mixtures thereof.

9. The gas phase process according to claim 7, wherein the weight of olefin polymer ranges from about 15 to about 75% of the total weight of the solid catalyst component (a).

10. The gas phase process according to claim 1, wherein the alkyl-Al compound (b) is selected from the group consisting of trialkyl aluminum compounds.

11. The gas phase process according to claim 1, wherein the aluminum alkyl compound is present in amount such that the Al/Ti molar ratio ranges from about 10 to about 400.

12. The gas phase process according to claim 1, wherein the external donor compounds are silicon compounds having at least a Si—O—C bond.

13. The gas phase process according to claim 12, wherein the silicon compounds are of formula $R_a^5 R_b^6 Si(OR^7)_c$, where a and b are integer from 0 to 2, c is an integer from 1 to 3 and the sum (a+b+c) is 4; $R^5$, $R^6$, and $R^7$, are alkyl, cycloalkyl or aryl radicals with 1-18 carbon atoms optionally containing heteroatoms selected from N, O, halogen and P.

14. The gas phase process of claim 1, wherein the polymerization is carried out in a gas-phase fluidized bed reactor.

15. The gas phase process of claim 1, wherein the polymerization is carried out in a gas-phase mechanically agitated bed reactor.

* * * * *

UNITED STATES PATENT AND TRADEMARK OFFICE
CERTIFICATE OF CORRECTION

| | | |
|---|---|---|
| PATENT NO. | : 10,730,974 B2 | Page 1 of 1 |
| APPLICATION NO. | : 15/750469 | |
| DATED | : August 4, 2020 | |
| INVENTOR(S) | : Morini et al. | |

It is certified that error appears in the above-identified patent and that said Letters Patent is hereby corrected as shown below:

On the Title Page

Column 1, item (30), Line 1, delete "15179708" and insert -- 15179708.1 --, therefor Signed and Sealed this
Twenty-fifth Day of October, 2022

Katherine Kelly Vidal
*Director of the United States Patent and Trademark Office*